US005695106A

United States Patent [19]

Bauknecht

[11] Patent Number: 5,695,106

[45] Date of Patent: Dec. 9, 1997

[54] CORRECTION OF REGISTERED SERVO INDEXED WEBS

[75] Inventor: Donald J. Bauknecht, Green Bay, Wis.

[73] Assignee: FMC Corporation, Chicago, Ill.

[21] Appl. No.: 791,014

[22] Filed: Jan. 27, 1997

Related U.S. Application Data

[63] Continuation of Ser. No. 518,001, Aug. 22, 1995, abandoned.

[51] Int. Cl.[6] .......... B65H 23/18; B23Q 15/00

[52] U.S. Cl. .......... 226/2; 226/30; 226/32; 226/45; 493/11

[58] Field of Search .......... 226/2, 3, 27, 30, 226/32, 45

[56] References Cited

U.S. PATENT DOCUMENTS

| | | | |
|---|---|---|---|
| 4,081,944 | 4/1978 | Sjöstrand | 226/2 |
| 4,403,718 | 9/1983 | Nagano | 226/2 |
| 4,485,949 | 12/1984 | Gebhart et al. | 226/2 |
| 4,717,059 | 1/1988 | Takahashi | 226/2 |
| 4,782,987 | 11/1988 | Giacomelli et al. | 226/2 |
| 5,000,725 | 3/1991 | Bauknecht | 226/32 |
| 5,098,507 | 3/1992 | Mao | 226/2 |
| 5,361,960 | 11/1994 | Fokos et al. | 226/2 |
| 5,470,300 | 11/1995 | Terranova | 226/32 |

FOREIGN PATENT DOCUMENTS

| | | |
|---|---|---|
| 0265208 | 4/1988 | European Pat. Off. . |

*Primary Examiner*—Daniel P. Stodola
*Assistant Examiner*—Matthew A. Kaness
*Attorney, Agent, or Firm*—Michael C. Penn

[57] ABSTRACT

A bag making machine automatically cuts off and seals plastic from a web of film in register with regularly spaced eyemarks. A correction system is disclosed for use when the film gets out of register with the eyemarks. When the correction system is activated, the film is advanced to the next eyemark. The bag making machine resumes normal in-register operation without ever shutting off the machine. A method of correcting lengths of bags being formed from a web of material is further disclosed.

15 Claims, 7 Drawing Sheets

EYEMARK HAS STOPPED MORE THAN 0.5" AHEAD OF SCANNER

BECAUSE EYEMARK STILL OUTSIDE WINDOW, EYEMARK NOW 0.75" AHEAD OF SCANNER.

MACHINE CONTINUES TO MAKE BAGS HAVING ADDITIONAL DIMENSION OF 0.25".

BUTTON DEPRESSED

R1 IS MEASURED

SCANNER DIRECTLY ON EYEMARK

CORRECTION OF REGISTERED SERVO INDEXED WEBS

This application is a continuation of application Ser. No. 08/518,001, filed Aug. 22, 1995, now abandoned.

BACKGROUND OF THE INVENTION

1. Field of the Invention

This invention relates to plastic bag fabricating machines and more particularly to systems for controlling operation of such machines.

2. Description of Related Art

Various machines exist for automatically fabricating plastic bags with economy and speed. Typically, these machines operate by drawing a predetermined length of plastic web from a supply roll and thereafter transversely cutting and thermally sealing the web to form a bag.

Frequently, it is desired to have labels, instructions or similar graphic material appear on the finished bags. To this end, the graphic material is printed onto the plastic web in regularly spaced locations or fields, and it is necessary to ensure that the web is cut and sealed only at precise locations between the fields in order to insure proper placement of the printed matter on the finished bag.

One technique for ensuring that the web is cut and sealed at the proper locations is to advance the web by a predetermined distance, or draw length, equal to the spacing of the printed fields. However, minor errors, resulting from stretching or shrinkage of the web as it is printed and wound onto and off of the supply roll, accumulate and gross misalignment can occur over time as the bag fabricating machine operates. Another technique for ensuring that the web is cut and sealed at the desired locations between adjacent printed fields is to print regularly spaced indexing marks or "eyemarks" on the web before the web is fed into the bag fabricating machine. An optical sensor detects the passage of each eyemark by a predetermined location and signals the machine when to stop, cut and seal the web. However, it is often desired to include printed matter between successive eyemarks. In order to avoid sensing other marks which appear to be eyemarks, it is preferred to enable the optical sensor only over a small interval or "window" in which the eyemark is expected to be seen. This technique is effective in correcting minor systematic errors in alignment (such as, an intermittent lengthening or shortening of the actual distance between eyemarks). Progressive errors can arise as a result of varying tensions as the web is wound and unwound from the supply roll, and this can result in the eyemarks failing outside of the sensing window. These types of errors can cause improper alignment of the printed matter on the finished bags.

Another method of correcting the cutting and sealing of individual bags is disclosed in U.S. Pat. No. 5,000,725, owned by applicant's assignee. Specifically, the control system disclosed in U.S. Pat. No. 5,000,725 functions to sense the actual spacing between a predetermined number of successive eyemarks. In the event the distances of such actual spacings shows a trend to deviate from the nominal draw length, the control system functions to change the nominal draw length to be substantially equal to the average of the actual spacings sensed. The control system helps ensure that the eyemarks continue to appear within the scanning window even though the actual spacings between eyemarks tend to deviate from the nominal draw length.

Referring to FIG. 1, there is shown a flow chart diagram regarding the operation of the control system disclosed in U.S. Pat. No. 5,000,725. The control system, after receiving an instruction to start operation, first reads and stores the nominal draw length entered by the system operator, as indicated by blocks 10 and 12, respectively. The control system then awaits the generation of "go" signal from the CPU located in a computer control circuit, as indicated by block 14. When a "go" signal is received, a servo motor for driving the draw rolls starts and the system monitors the advancement of the web by counting pulses from an encoder directly coupled to the servo motor until it is determined that the web has been advanced to within a specified distance (such as one-half inch) of the current calculated draw length as shown by block 16. It will be appreciated that the specified distance sets the width of the scanning "window."

Once it has been determined that the web has been advanced to within the specified distance of the calculated draw length, an optical scanner is enabled and both the optical scanner and the servo motor are monitored until either the leading edge of the eyemark is detected by the scanner or the servo motor stops running, as shown by blocks 18 and 20, respectively. When either event occurs, an encoder counter is set to zero and the status of the servo motor is ascertained, as shown by blocks 22 and 24, respectively.

While the servo motor is running, the system idles and the encoder count increases as the motor shaft rotates. When the servo motor stops running, thereby indicating that the web has been advanced by the current calculated draw length, a constant R1 is set equal to the final encoder output, as shown by block 26. Accordingly, R1 represents the length by which the leading edge of the eyemark is displaced from the optical scanner when the web has stopped.

The program then determines whether the value of R1 is approximately zero (i.e., less than 0.03 inches), as shown by block 28. When an eyemark does appear within the scanning window, R1 will be non-zero. The program then determines the non-zero value of R1 as shown by block 30. If R1 is less than 0.2 inches or is greater than 0.3 inches, for example, a variable constant R3 is incremented by the print repeat length PR, as shown by block 32. The print repeat length PR, which is equal to DL+Y−X, represents the draw length of the next bag forming cycle where X is the distance the leading edge of the eyemark went past the scanner during the current bag-forming cycle, Y is the distance the leading edge of the next preceding eyemark went past the scanner during the immediately preceding bag-forming cycle, DL is the total distance the web has been advanced for formation of the current bag and PR is the distance between successive eyemarks. Further, the variable constant R2 is incremented by one, as also shown in block 32, and serves to indicate the number of times that an eyemark has fallen within the scanning "window" but not within the desired range of the "window" midpoint.

R2 is next compared against a predetermined constant representing the number of consecutive times that R1 fails to fall within the desired range of the midpoint, as shown by block 34. In the illustrated example, ten such consecutive failures can occur before the system takes action to change or update the nominal draw length. As long as R2 remains less than the predetermined constant, the next or calculated draw length DL is set equal to the nominal repeat length, minus R1, and plus 0.25 inches, as shown by block 36. For this cycle, however, R2 and R3 are not set equal to zero and these values are retained as the system returns to await initiation of the next bag forming cycle.

In the event a discrepancy persists between the actual spacing between eyemarks and the nominal draw length, the variable constant R2 will eventually equal the predetermined constant (ten in the illustrated example). At the same time, the variable constant R3 will substantially equal the sum total of the actual distances between eyemarks over the preceding ten consecutive bag fabricating cycles when this occurs, the system calculates the average actual distance between consecutive eyemarks and changes the nominal draw length to the calculated average. Thereafter, the variable constants R2 and R3 are set to zero and the system recycles to await initiation of the next bag fabricating cycle, as shown by block 38.

When the web and the printed matter thereon is in proper registration relative to the transverse cut and seal bar, the leading edge of the eyemark should appear substantially midway between the limits or edges of the scanning "window." In the example illustrated, such proper registration is indicated by R1 having a value of substantially 0.25 inches or one-half the scanning window width. Accordingly, if R1 has a value between 0.2 inches and 0.3 inches, acceptable registration is indicated. In this event, the pair of additional variable constants R2 and R3, are set to zero, as shown by block 40. Further, the next draw length is set equal to the nominal draw length minus the current R1 value plus one-half the width of the scanning "window", as shown by block 36.

In the event that the eyemark is not detected by the optical scanner (i.e., R1 is less than 0.03 inches), then the value of the next draw length is set to the value of the current draw length plus half the scanning window of 0.25 inches, as shown by block 42. Thus, the printed eyemark is advanced when the eyemark gets out of the scanning window, the window being, for example, 0.5 inches and the eyemark gains on the scanning device until the mark is located within the window.

However, the film can get out of register by a large amount (i.e., the eyemark may be a half an inch or more away from the edge of the scanner when a given bag is being cut). As a result, the prior art systems may not fully compensate for the error in film cutting because the scanner may not properly be able to read the eyemarks. This condition could occur for several reasons. For example, the printed eyemarks may have wandered from under the scanning device, there may have been a temporary malfunction of the scanning device, there may be a splice in the film, or the eyemarks may not be printed for a section of the film.

When this occurs, the bag machine operator may have to do one of two things. The operator may first have to wait for the regular registration means to advance the film by a small amount for each bag until the mark again appears in the scanning window. This, however, could take forty or more bags before the marks would get back in synchronization within the scanning window. As a result, these forty or more bags may be irregular bags. The more commonly used alternative involves the operator stopping the machine, advancing the film until the printed mark is under the scanner, lowering the cutting/sealing device to cut the film, and then restarting the machine. These alternatives are time consuming and may slow down the operation. It is therefore desirable to have a correction system which may correct large errors when cutting webs of film.

SUMMARY OF THE INVENTION

There is provided a method of correcting the advancement of lengths of material having regularly spaced eyemarks thereon comprising the steps of: determining a failure to sense an eyemark disposed on the material; activating a sensor for sensing the passage of a first succeeding eyemark disposed on the material, the sensor being enabled for an open scanning window; activating the sensor for a portion of a length between the regularly spaced eyemarks after the first succeeding eyemark has been sensed; determining a correction distance between the first succeeding eyemark and a location when the material is stopped; and advancing the material by the correction distance; wherein the material is advanced such that a second succeeding eyemark is disposed around the sensor when the sensor is activated for said portion of a length between the regularly spaced eyemarks.

There is also provided a method of correcting lengths of bags being formed from a web of material comprising the steps of: measuring a correction distance from which a leading edge of an eyemark disposed on the web is displaced from a scanner when the web has temporarily stopped for a time when forming a leading bag, the temporary stopping time being a period between a successive continuous formation of individual bags; advancing the web by the correction distance for forming a shorter first trailing bag; and advancing the web for forming a successive trailing bag by a nominal draw length, the successive trailing bag being formed after the shorter first trailing bag.

There is further provided a method of correcting lengths of bags being formed from a web of material comprising the steps of: enabling a scanner; detecting whether the web of material is moving; detecting an eyemark disposed on the web by the scanner; measuring a correction distance from which a leading edge of the eyemark is displaced from the scanner when the web has temporarily stopped for a time when forming a leading bag; the temporary stopping time being a period between a successive continuous formation of individual bags; advancing the web by the correction distance for forming a shorter first trailing bag; and advancing the web for forming a successive trailing bag by a nominal draw length, the successive trailing bag being formed after the shorter first trailing bag.

Moreover, there is provided a correction system for correcting the advancement of lengths of material having regularly spaced eyemarks thereon comprising: means for determining a failure to sense an eyemark disposed on the material; starter means for activating a sensor for sensing the passage of a first succeeding eyemark disposed on the material, the sensor being enabled for an open scanning window; means for activating the sensor for a portion of a length between said regularly spaced eyemarks after the first succeeding eyemark has been sensed; means for determining a distance between the first succeeding eyemark and a location when the material is stopped; means for advancing the material by the distance; wherein the material is advanced such that a second succeeding eyemark is disposed around the sensor when the sensor is activated for the portion of a length between the regularly spaced eyemarks.

There is further provided a correction system for correcting lengths of bags being formed from a web of material comprising: means for determining a failure to sense an eyemark disposed on the web when producing a leading bag; starter means for activating a sensor for sensing the passage of an eyemark disposed on the web, the sensor being enabled for an open scanning window; means for determining a distance between the eyemark and a location when the web is stopped for cutting and sealing; means for advancing the web by the distance for forming a shorter trailing bag; and means for forwarding the web for forming a successive trailing bag by a nominal draw length. The means for determining a distance may, for example, comprise an encoder coupled to a motor, the motor being disposed on a bag making machine, the encoder being coupled to a computer control circuit. Further, the means for advancing may, for example, comprise a motor controller coupled to the computer control circuit, the motor being further coupled to the motor controller and draw rolls disposed on the bag making machine, the draw rolls being operatively connected to the motor.

DESCRIPTION OF THE PREFERRED EMBODIMENTS

Figure 1:
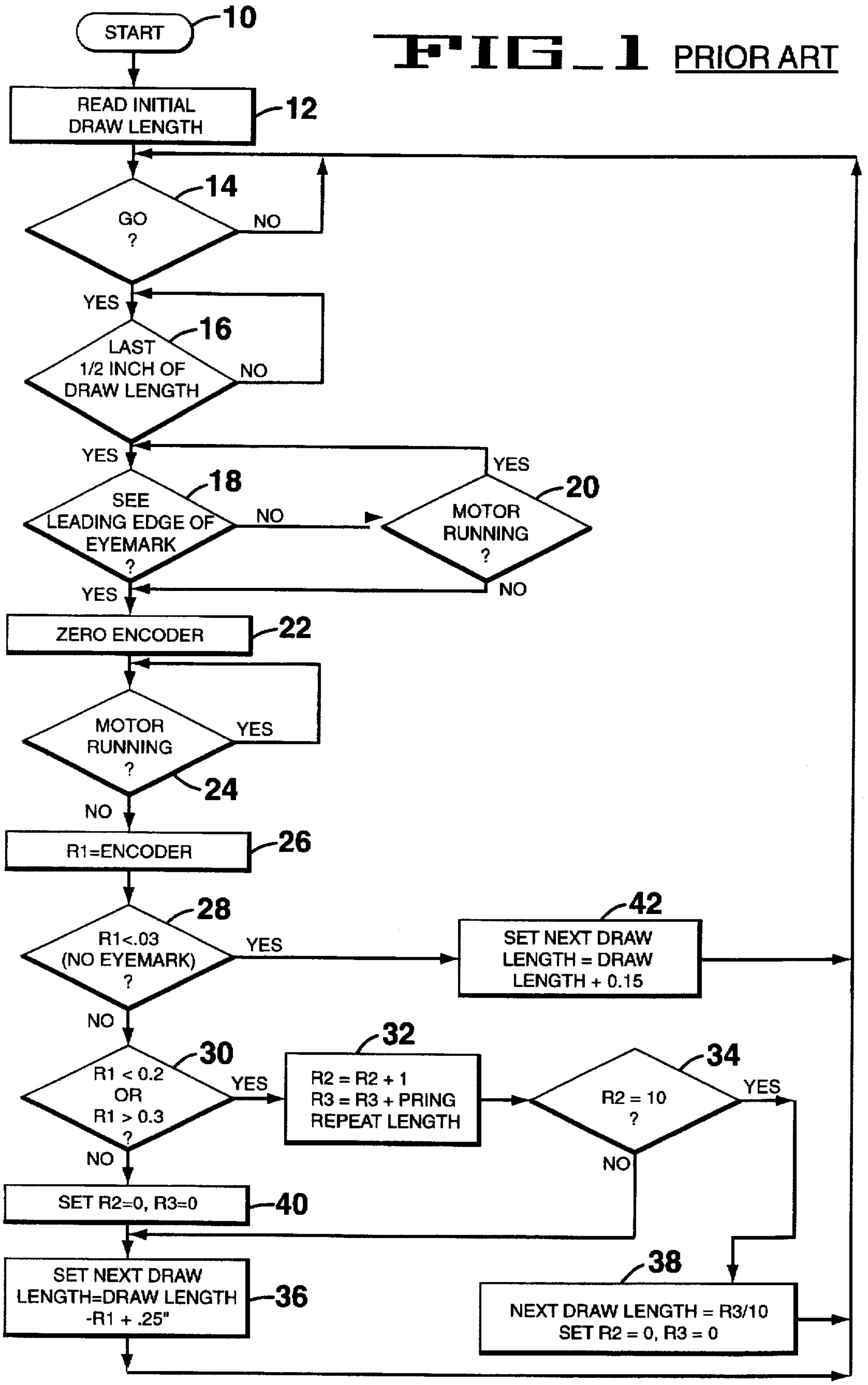
FIG. 1 PRIOR ART
FIG. 1 is a flow chart diagram of a prior art system for correcting the placement of a plastic web.
Figure 2:
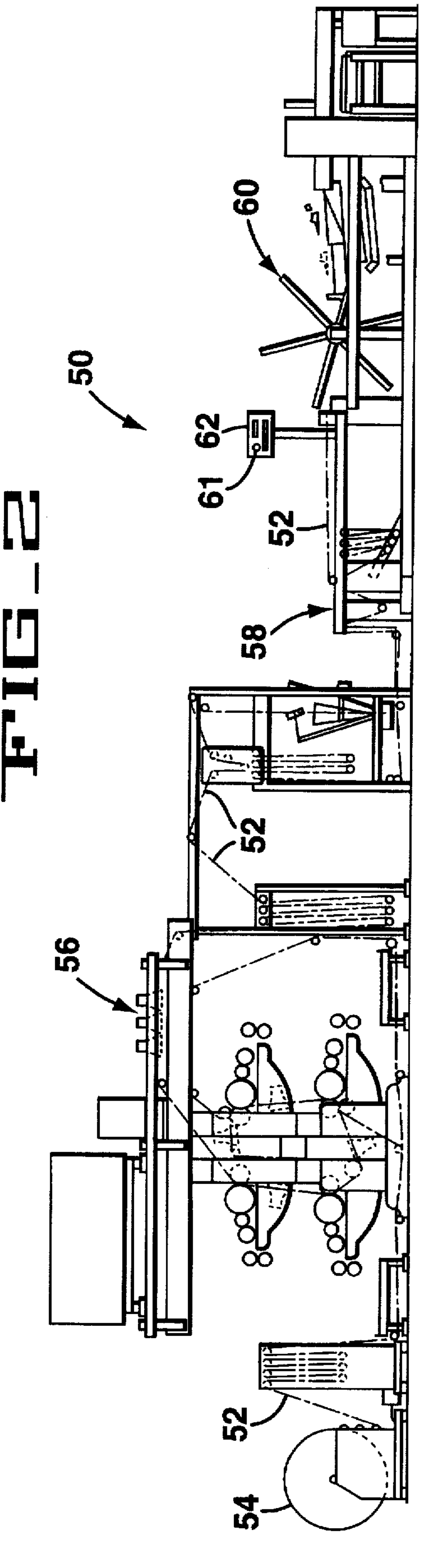
FIG. 2 is a side elevation view of a bag fabricating system of the present invention including a bag machine operable to form plastic bags from plastic web.

A system 50 for automatically fabricating plastic bags from a continuous plastic web 52 is illustrated in FIG. 2. As shown, the system 50 includes a supply roll 54 containing the web 52, and an optional print mechanism 56 for repetitively printing graphic material at regularly spaced locations on the web 52. The system 50 further includes a bag machine 58 for transversely cutting and sealing the web 52 to form individual plastic bags, and an optional stacker mechanism 60 for stacking the bags formed by the bag machine 58. A user-operable control panel 62 provides user-control over the automatic bag fabricating system 50. There is also shown a starter 61, which may be, for example, a button on the control panel 62 for activating the correction system of the present invention.

Figure 3:
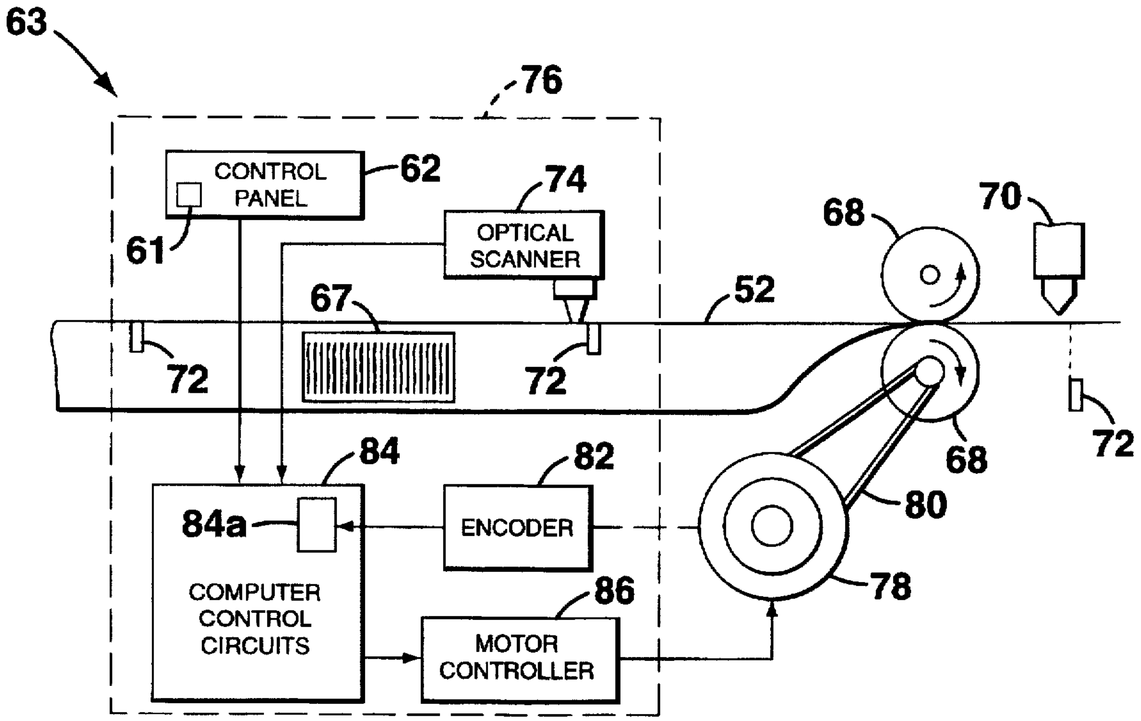
FIG. 3 is a simplified block diagram of a correction system of the present invention.

Referring to FIG. 3, the correction system 63 is shown. To ensure proper registration of the seal relative to the printed matter 67 on the web 52, a plurality of eyemarks 72 are printed at regular intervals along the edge of the web 52, and an optical scanner or sensor 74 photoelectrically senses the passage of each eyemark 72. Because other printed matter 67, detectable by the optical scanner 74, frequently appears between successive eyemarks 72, the optical scanner 74 is generally not continuously enabled, but rather, is enabled only for brief periods during which it is expected that the eyemark 72 should appear. That is, the optical scanner 74 is turned on during a specific "window" of the bag length, typically the last one-half inch of each advancement of the web 62. In this manner, the optical scanner 74 is only responsive to eyemarks 72 appearing within the scanning window. However, when starter 61 is depressed, the optical scanner 74 becomes continuously enabled until the correction of the bag lengths is complete, as will be described.

The computer controls circuit 84 may, for example, only read the signals generated by the scanner 74 during the last half inch of a bag being formed during normal operation. As used in this patent, the term enabling or activating a scanner means either reading the signal generated by the scanner 74 or turning on the scanner 74 to generate a signal so that it may be input to the computer control circuit 84.

The correction system 63 comprises a control system 76 which preferably includes control panel 62 with a starter 61 and optical scanner 74. The correction system 63 further comprises an electrical servo motor 78 disposed on the bag machine 58. The servo motor 78 is coupled, by means of a belt 80 or similar arrangement, to the draw rolls 68. The control system 76 further includes an encoder 82 which is directly coupled to the motor 78 and which functions to provide electrical pulses indicative of the rotation of the motor shaft (e.g., 4000 pulses per motor revolution). The signals generated by the encoder 82, the control panel 62 including the starter 61, and the optical scanner 74, are fed as inputs to computer control circuit 84. The computer control circuit 84 respond to these inputs by instructing a motor controller 86 to drive the motor 78 so as to advance the web 52 a sufficient distance to provide a desired orientation of the eyemarks 72 relative to the transverse cut and seal bar 70. The computer control circuit 84, which may include a central processing unit, may also include a resetable counter 84a which counts the pulses developed by the encoder 82.

Figure 4:
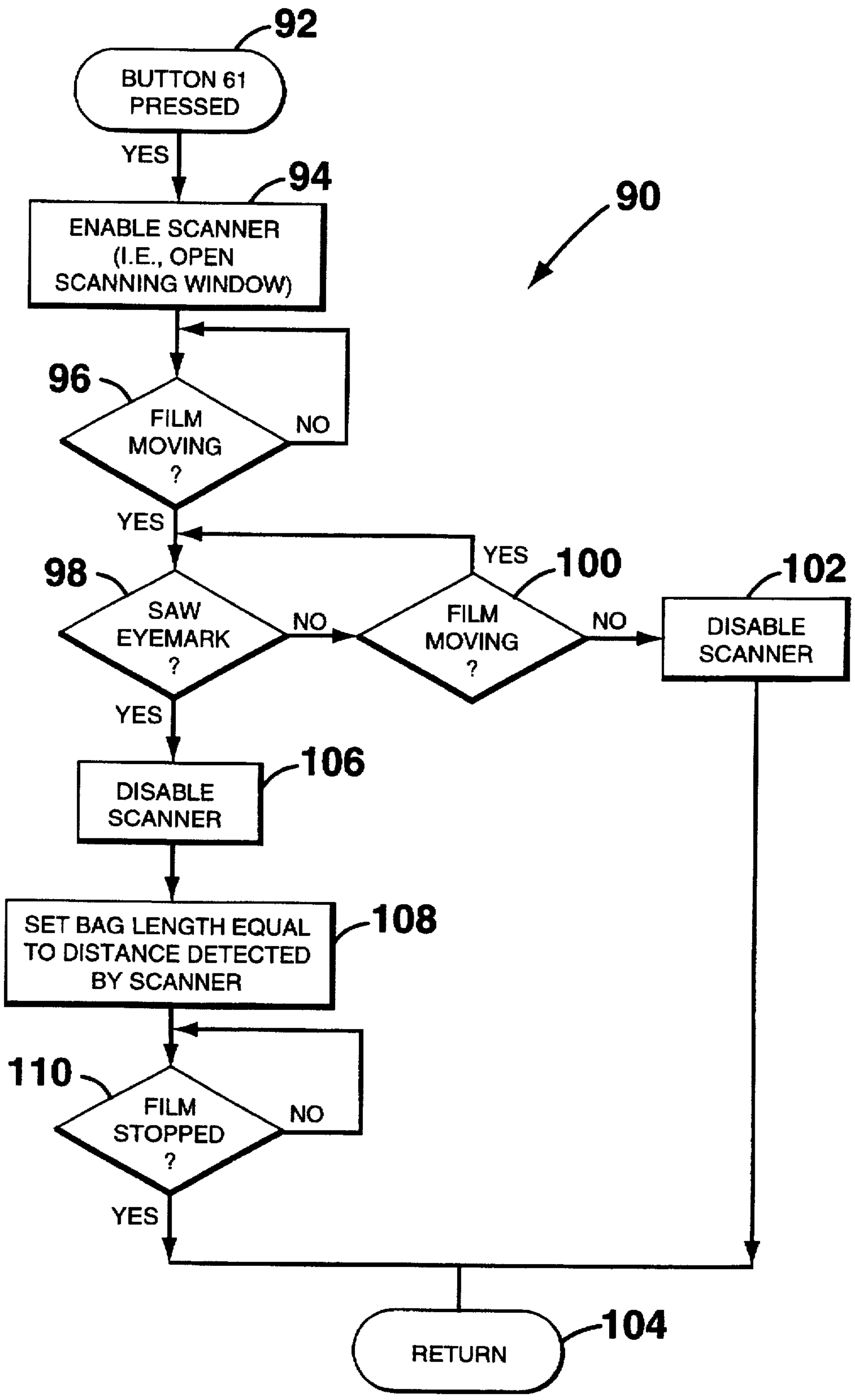
FIG. 4 is a flow chart diagram useful in understanding the operation of the correction system for correcting large errors in the placement of the web when cutting and sealing the same for forming bags.

The control system 76 of the present invention is preferably implemented utilizing microprocessor-based circuitry in conjunction with suitable programming. One possible program 90 for implementing the correction system 13 of the present invention is shown in FIG. 4. Program 90 may correct large errors in the placement of the web when cutting and sealing the same for forming bags.

If an operator of a bag making machine 58 determines that the eyemark 72 is no longer in the scanning window (i.e., the eyemark has stopped one half inch or more past the scanner), the operator may, for example, depress a button 61 disposed on the control panel 62, as indicated by block 92. The program 90 then enables the scanner, opening the scanning window for the entire length of the bag to be formed (as opposed to opening up the scanning window for the last half inch of the bag), as indicated by block 94. Once the web 52 has temporarily stopped, the program 90 then waits for the film 52 to start moving, as indicated by block 96. This temporary stopping time is the time period between a successive continuous formation of individual bags. As a result, the operator does not have to turn off the machine in order to affect correction of the web 12 length.

After the film 52 starts to move, the program 90 then waits for either the scanner 74 to detect an eyemark 72 or for the film 52 to stop moving, as indicated by blocks 98 and 100, respectively. If the film 52 has stopped before the scanner 74 sees an eyemark 72, then the program 90 simply reverts back to the standard registration routine after the scanner 74 has been disabled, indicated by blocks 104 and 102 respectively. The film 52 may stop before the scanner sees an eyemark 72 where, for example, the film 52 fails to have eyemarks 72 printed thereon.

If, however, an eyemark 72 is detected, then the scanner 74 is disabled, as indicated by block 106. Further, the exact distance at which the eyemark 72 was seen is recorded as R1. This value R1 is the correction distance which is then used as the next length of film to be fed ahead, forming a shorter trailing bag, as indicated by block 108. The measuring of the correction distance R1 may comprise encoder 82 which may be coupled to servo motor 78 disposed on the bag-making machine 58 and operable to generate a signal indicative of motor revolution. The shorter trailing bag should have its eyemark 72 within the scanning window. After the shorter trailing bag is formed (i.e., when the film has stopped as indicated by block 110), the program reverts back to the standard registration routine, as shown by block 104. Thereafter, a main program may produce successive trailing bags having a the desired or nominal draw length. Thus, the bag making machine 58 does not have to be shut off when correcting the large error in the placement of the web relative to the cutting and sealing bar 70.

Figure 5A:
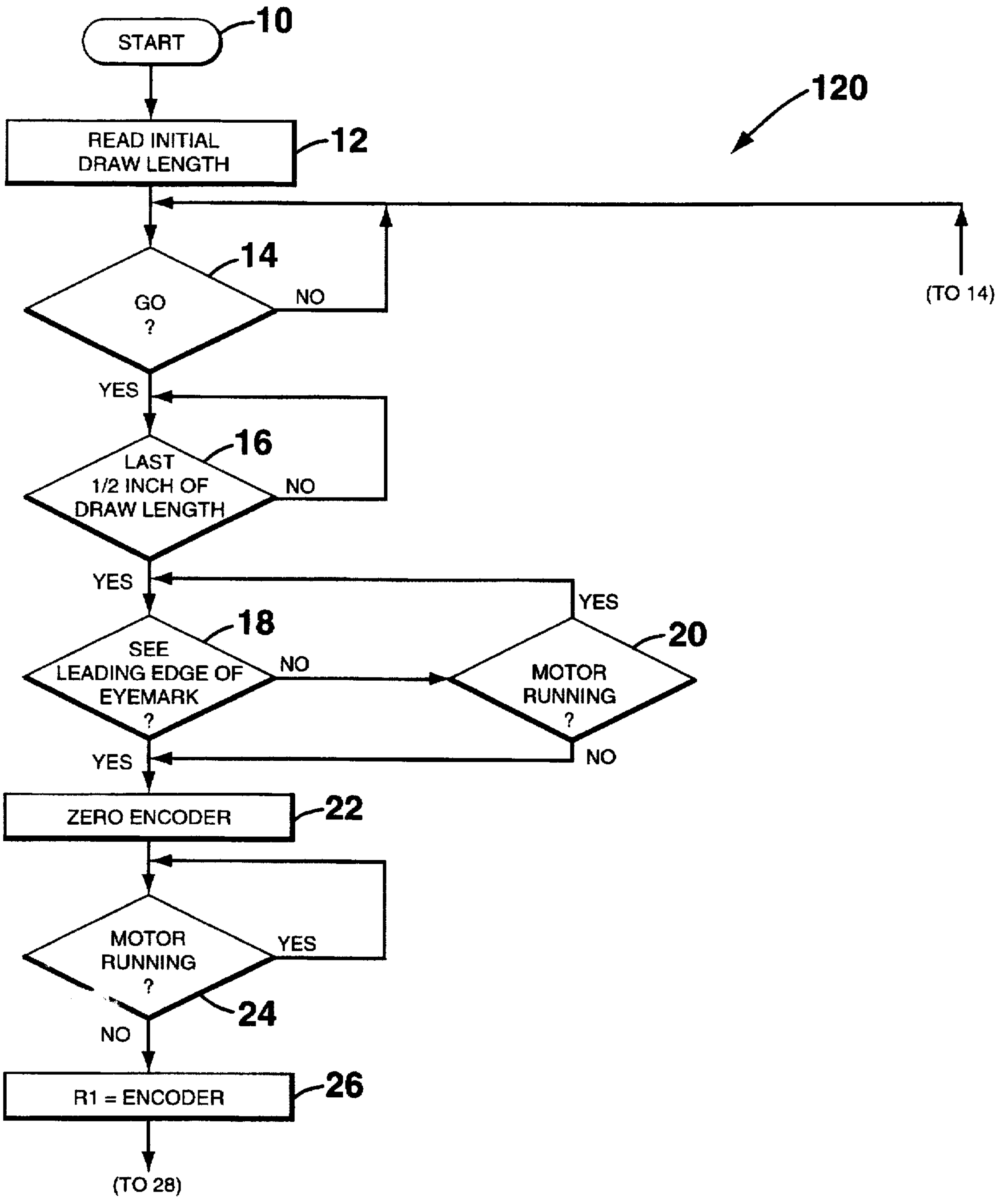
FIGS. 5A and 5B are flow chart diagrams useful in understanding the operation of the correction system in conjunction with a program for feeding film for continuously making bags.
Figure 5B:
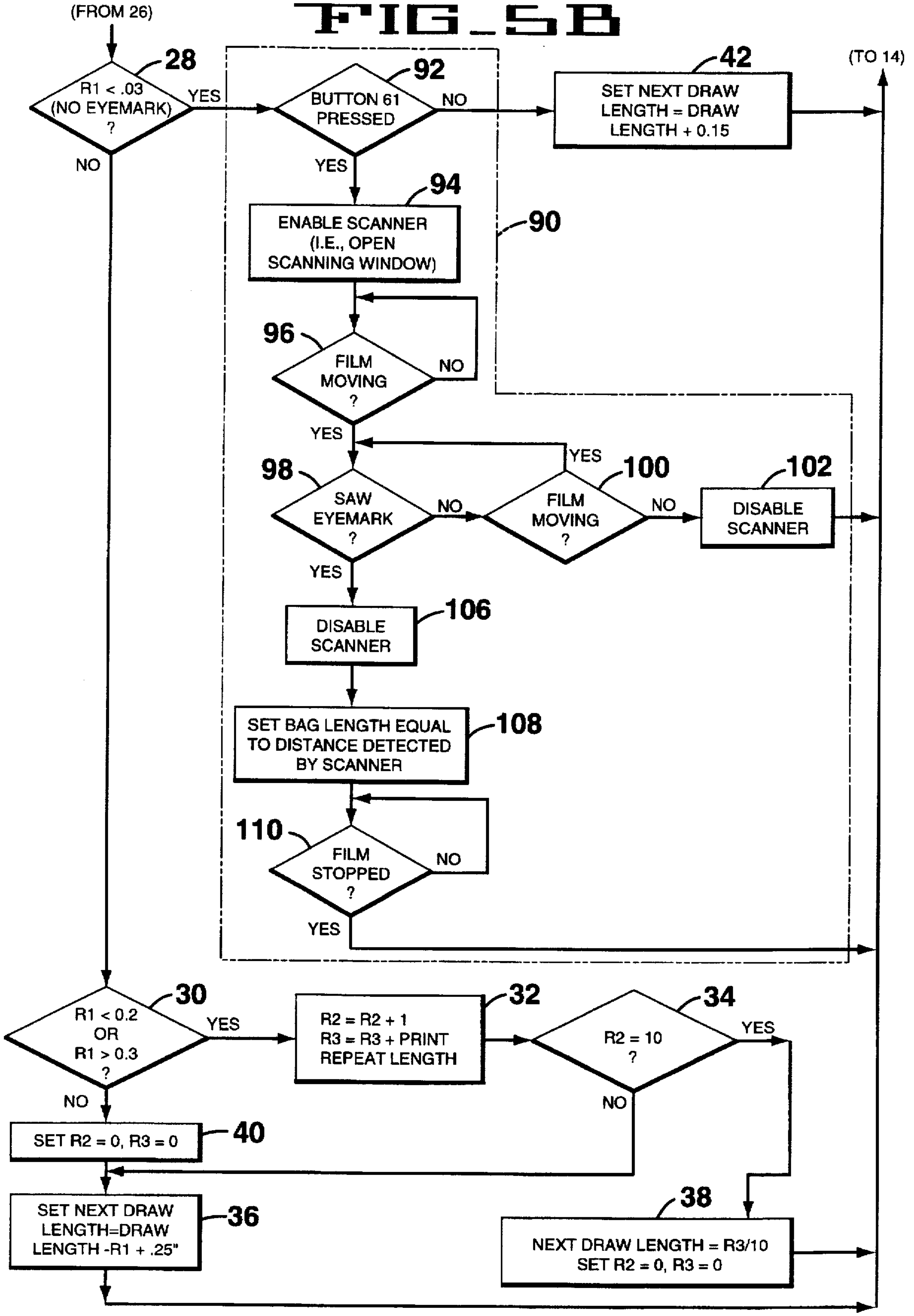

One possible standard registration routine program 120 having a correction subroutine 90 is exemplified by the flow chart diagram of FIGS. 5A and 5B. Similar items have been labeled similarly for purposes of clarity. Further, for purposes of clarity, subroutine 90, which is illustrated as a block in FIG. 5B, is shown together with a main program 120, the main program including all items except for subroutine 90.

As with the prior art system, the main program 120 initially reads and stores the draw length and once a go signal is generated, the system monitors the advancement of the web until the scanning window is reached (i.e., the last half of an inch of the current calculated draw length in the illustrated example), as shown by blocks 10–16. Similarly, the program then proceeds to measure the value R1, via blocks 18–26.

The program then forwards to block 28. In the event the eyemark 72 is not detected by the optical scanner 74 during the scanning "window", then the value of R1 will be substantially zero. If R1 is substantially zero (i.e., less than 0.03 inches in the example illustrated), then that may mean that the web was stopped for sealing and cutting at approximately where the scanner 74 sensed the eyemark 72. Alternatively, it may mean that the eyemark 72 was not sensed during the scanning window.

In either case, the program forwards to block 42 if the starter 61 is not, for example, depressed, then the correction system 73 increases the next repeat length by a predetermined increment, such as half the scanning window or 0.25 inches in the illustrated example, and the system enters an idle to await the generation of a "go" signal. Thus, it will be appreciated that the length of each subsequent advancement of the web 52 will be the nominal repeat length plus 0.25 inches, and an eyemark 72 will eventually appear within the scanning window. That is, if the web 52 stops close to an eyemark 72 slightly ahead of the scanning window, then the control system 76 will advance the next draw length by an additional 0.25 inches. As a result, the eyemark 72 associated with the formation of a given bag should shortly appear within the scanning window.

However, if the eyemark 72 is not slightly ahead of the scanning window, then it may take more then the formation of a few bags before the eyemark 72 for the formation of a given bag is located within the scanning window. When this occurs, the operator may, for example, hit a button 61 disposed on the control panel 62 (FIG. 3). As a result, subroutine 90 may be called.

As discussed in connection with FIG. 4, if the starter 61 is depressed, then the scanner is enabled for the entire length of the bag to be formed and the subroutine 90 waits for the film to start moving, as indicated by blocks 92–96. If an eyemark 72 is detected, then the scanner 74 is disabled, as indicated by block 106. The exact distance at which the eyemark was seen is recorded as R1 and this value is then used as the next length of film to be fed ahead, forming a shorter trailing bag, as indicted by block 108. The shorter trailing bag should have its eyemark 72 within the scanning window once the film has stopped, indicated by block 110. After the shorter trailing bag is formed, the program reverts back to the main program 120. Preferably, the subroutine 90 forwards to the main program 120 so that it may proceed with the next bag fabricating cycle, such as at the point where it awaits for a "go" signal, as indicated by block 14. As a result, the control system 76 would be ready to count the next movement of the web for forming a next bag.

As shown in blocks 100, 102, and 104, if the film 62 has stopped before the scanner 74 sees an eyemark 72, then the subroutine 90 simply reverts back to the standard registration routine or main program 120 after the scanner 74 has been disabled. That is, the subroutine 90 would proceed to the main program 120 so that it may proceed with the next fabricating cycle.

Where an eyemark 72 is detected, the control system 76 determines what range the value R1 falls within, as indicated by block 30. Where the value of R1 is, for example, less than 0.2 inches (but greater than a nominal amount such as 0.03 inches) or greater than 0.3 inches, the control system counts the number of times this would occur, as indicated by block 32. If the number of times would be less than a given number, say ten, the control system sets the next draw length equal to the draw length plus half the scanning window minus the value of R1, as indicated by blocks 34 and 36. Where this given sequence occurs more than ten times, the control system sets the next draw length as the running average for the past ten draw lengths where R1 is less than 0.2 inches (but greater than 0.03 inches) or greater than 0.3 inches, as indicated by block 38. However, the running average preferably does not change if the value of R1 is between 0.2 inches and 0.3 inches prior to reaching the required ten times, as indicated by block 40. Where the value of R1 is, for example, between 0.2 inches and 0.3 inches, the draw length may be set to the value PR plus half the scanning width minus the value of R1, as shown by block 36. Then, the program returns to the point where it awaits for another "go" signal to begin, as indicated by block 14.

Preferably the large correction program 90 is a subroutine disposed in the CPU of the computer control circuit 84. This subroutine may, for example, be called when the normal operating program for feeding the web 52 no longer senses the eyemarks 72 for a given scanning window. Preferably, the subroutine 90 is activated by an operator by depressing button 61 on the control panel 62. Alternatively, the subroutine 90 may be automatically called if an eyemark in block 28 is not sensed a given number of times such as five or any specific number of times that an operator may input. As a result, instead of proceeding to block 42, the main program would call subroutine 90 to provide correction of the placement of the web 52 relative to the eyemarks 72. In such a case, the starter 61 would comprise a means for sensing the failure of a mark a given number of times for calling the correction program 90 disposed in the computer control circuit 84.

Figure 6A:
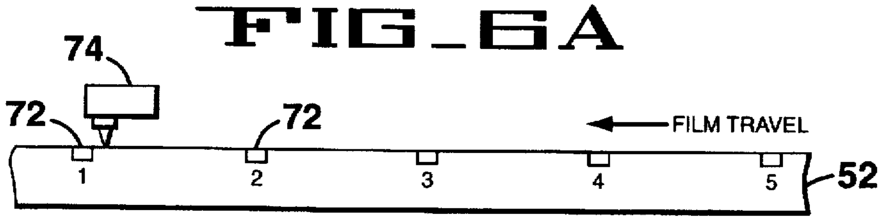
FIGS. 6A–6F are diagrammatic views of the web of film illustrating the operation of the correction system.
Figure 6B:
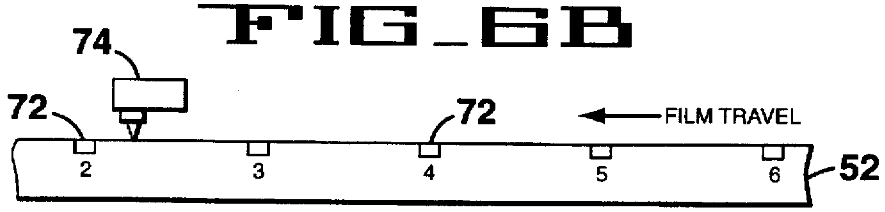
Figure 6C:
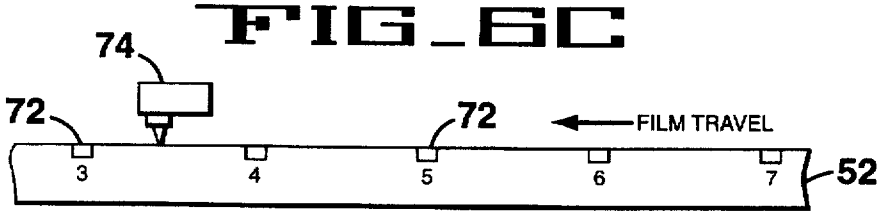
Figure 6D:
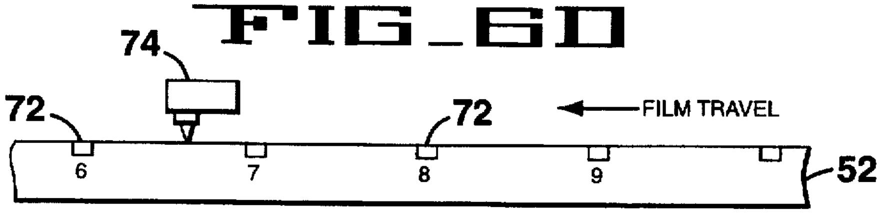

Referring now to FIGS. 6A–6F, there is shown a diagrammatic view of a web of film 52 illustrating the operation of the correction system 63. In FIG. 6A, the eyemark 72 for a bag 1 to be formed has stopped more than 0.5 inches ahead of the scanner 74. FIG. 6B shows how the main program 120 forwards the web 52 by a nominal bag length plus 0.25 inches so that the eyemark 72 may now, for example, be 0.75 inches ahead of the scanner when forming a second bag 2. FIG. 6C shows how the bag making machine 58 continues to make a third bag 3 having a nominal bag length plus 0.25 inches. As a result, the eyemark 72 may now be one inch ahead of the scanner 74. FIG. 6D shows how the subroutine

90 has been called after the formation of bag 6 by preferably depressing a starter button 61 during, for example, the formation of bag 6. The web 52 starts to move so that the encoder 82 may count the distance R1 which is the distance from when the web stopped moving until the point where an eyemark 72 is detected. Otherwise, the program will wait until that given bag is formed before it will activate the subroutine so that the value of R1 may be measured.

Figure 6E:
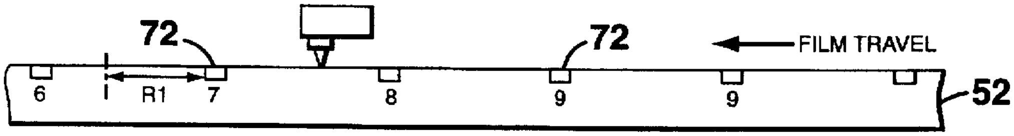
Figure 6F:
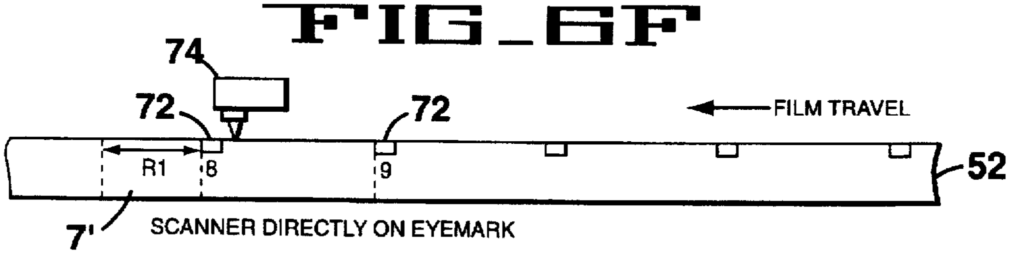

Because subroutine 90 has been activated, the scanner 74 is enabled for the entire bag length (i.e., an open window). As shown by FIG. 6E, the value R1 is measured, R1 being the correction distance. Then a short trailing bag 7' is formed, the short bag having a length equal to the correction distance R1, as shown in FIG. 6F. As a result, the appropriate eyemark 72 will then be back in the scanning window. Thereafter, the system may resume normal registration control which may be performed by program 120 so that the next bag 8 having a nominal or desired draw length may be formed. The nominal draw length may be, for example, substantially equal to an average of actual measured spacing between successive ones of the eyemarks plus or minus a measured error quantity determined during the previous draw plus a portion of a scanning zone between the eyemarks, as disclosed in U.S. Pat. No. 5,000,725, which is incorporated herein by reference.

In short, there is disclosed a method and a correction system for correcting the advancement of lengths of material having regularly spaced eyemarks 72 thereon. Although the invention has been described in terms of a bag-making machine 58, the invention may also apply to any system or method for correcting the advancement of lengths of material, including, but not limited to machines directed to cut-to-length operations. Further, the invention may be applied to any materials having regularly spaced eyemarks 72 thereon.

As disclosed, the correction system 63 comprises a means for determining a failure to sense an eyemark 72 disposed on a material 52, such as an optical scanner or sensor 74 and a computer control circuit 84 and means for activating the sensor 74 for sensing the passage of a first succeeding eyemark 72 disposed on the material 52, the sensor 74 being enabled for an open scanning window. That is, the sensor is enabled until, for example, a second succeeding eyemark 72 is detected as opposed to only enabling a sensor for a set portion of a length between regularly spaced eyemarks such as, for example, the last half an inch of a bag being formed. The correction system 63 further comprises means for activating the sensor 74 for a portion of a length between the regularly spaced eyemarks 72 after the first succeeding eyemark has been sensed (i.e., the correction system enables the sensor 74 for a portion of a length between the regularly spaced eyemarks). The correction system 63 also comprises means for determining a correction distance R1 between the first succeeding eyemark 72 and a location when said material is stopped. The means for determining a correction distance may comprise an encoder 82 coupled to a motor 78. The correction system also comprises a means for advancing the material 52 by the correction distance R1, which may be, for example, a motor controller 86 coupled to the computer control circuit 84. The material 52 may be advanced such that a second succeeding eyemark 72 is disposed around the sensor 74 when said sensor is activated for the portion of a length between the regularly spaced eyemarks 72.

Preferably, the correction system is used in conjunction with film or other material having no printed material 67 in the region where the scanner 74 may sense such printed material. That is, preferably there is no printed material other than the eyemarks 72 where in the region where the scanner is sensing. Otherwise, when the starter 61 is activated, the system 50 may forward the indexing to the printed material sensed because block 94 of FIGS. 4 and 5B enables the scanner 74 until an eyemark 72 is sensed or the web 52 has stopped moving. Of course, printed material may be located on the material 52 in a region where the scanner 74 does not sense.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A method of correcting the advancement of lengths of material having regularly spaced eyemarks thereon comprising the steps of:

activating a sensor only during a scanning window, said scanning window being a portion of a length of a bag being formed;

determining a failure to sense an eyemark disposed on said material by said sensor during said scanning window;

in response to determining said failure to sense said eyemark, activating said sensor for sensing the passage of a first succeeding eyemark disposed on said material, said sensor being activated to sense for a length of said material greater than said scanning window until said first succeeding eyemark has been sensed;

determining a correction distance between said first succeeding eyemark and a location when said material is stopped; and advancing said material by said correction distance.

2. The method of claim 1 further comprising the step of activating said sensor only during said scanning window after said first succeeding eyemark has been sensed.

3. The method of claim 1 wherein said material is stopped for a temporary time, said temporary stopping time being a period between a successive continuous formation of individual bags.

4. The method of claim 1 further comprising the step of advancing said material for forming a successive trailing bag by a nominal length.

5. The method of claim 4 wherein said material is advanced by said correction distance for forming a shorter first trailing bag and said successive trailing bag is formed after said shorter first trailing bag.

6. A method of correcting lengths of bags being formed from a web of material comprising the steps of:

activating a sensor only during a scanning window, said scanning window being a portion of a length of a bag being formed;

determining a failure to sense an eyemark disposed on said web by said sensor during said scanning window;

in response to determining said failure to sense said eyemark, activating said sensor for sensing the passage of a first succeeding eyemark disposed on said web, said sensor being activated to sense for a length of said web greater than said scanning window until said first succeeding eyemark has been sensed;

measuring a correction distance from which said first succeeding eyemark is displaced from a scanner when said web has temporarily stopped for a time when forming a leading bag, said temporary stopping time being a period between a successive continuous formation of individual bags;

advancing said web by said correction distance for forming a shorter first trailing bag; and advancing said web for forming a second trailing bag by a nominal draw length, said second trailing bag being formed after said shorter first trailing bag.

7. The method of claim 6 wherein said step of measuring said correction distance comprises an encoder coupled to a motor disposed on a bag-making machine and operable to generate a signal indicative of motor revolution.

8. The method of claim 6 further comprising the step of activating a starter prior to said step of measuring said correction distance.

9. The method of claim 6 wherein said nominal draw length is substantially equal to an average of actual measured spacing between successive ones of said eyemarks plus or minus a measured error quantity determined during the previous draw plus a portion of a scanning zone between said eyemarks.

10. A correction system for correcting the advancement of lengths of material having regularly spaced eyemarks thereon comprising:

means for activating a sensor only during a scanning window, said scanning window being a portion of a length of a bag being formed;

means for determining a failure to sense an eyemark disposed on said material during said scanning window;

starter means for activating said sensor for sensing the passage of a first succeeding eyemark disposed on said material, said starter means activating said sensor in response to a failure to sense an eyemark by said means for determining a failure to sense an eyemark, said sensor being activated to sense for a length of said material greater than said scanning window until said first succeeding eyemark has been sensed;

means for determining a distance between said first succeeding eyemark and a location when said material is stopped; and means for advancing said material by said distance.

11. The invention of claim 10 further comprising means for activating said sensor during said scanning window after said first succeeding eyemark has been sensed.

12. The invention of claim 10 wherein said means for determining a distance comprises an encoder coupled to a motor, said motor being disposed on a bag making machine, said encoder being coupled to a computer control circuit.

13. The invention of claim 10 wherein said means for advancing comprises a motor controller coupled to said computer control circuit, said motor being further coupled to said motor controller and draw rolls disposed on said bag making machine, said draw rolls being operatively connected to said motor.

14. The invention of claim 10 wherein said starter means comprises an operator depressible button.

15. The invention of claim 10 wherein said starter means comprises a means for sensing a failure of a mark a given number of times for calling a correction program disposed in a computer control circuit.

* * * * *